(12) United States Patent
Nagoya (10) Patent No.: US 10,838,251 B2
(45) Date of Patent: Nov. 17, 2020

(54) PHASE MODULATION DEVICE

(71) Applicant: JVCKENWOOD Corporation, Yokohama (JP)

(72) Inventor: Takashi Nagoya, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/842,026

(22) Filed: Apr. 7, 2020

(65) Prior Publication Data
US 2020/0233262 A1  Jul. 23, 2020

Related U.S. Application Data

(63) Continuation of application No. PCT/JP2018/037206, filed on Oct. 4, 2018.

(30) Foreign Application Priority Data

Oct. 11, 2017  (JP) .................................. 2017-197402

(51) Int. Cl.
| | | |
|---|---|---|
| G02F 1/1335 | (2006.01) | |
| G02B 5/30 | (2006.01) | |
| G02F 1/1343 | (2006.01) | |
| G02F 1/31 | (2006.01) | |
| G09G 3/36 | (2006.01) | |

(52) U.S. Cl.
CPC ......... *G02F 1/133553* (2013.01); *G02B 5/30* (2013.01); *G02F 1/134309* (2013.01); *G02F 1/31* (2013.01); *G09G 3/36* (2013.01)

(58) Field of Classification Search
None
See application file for complete search history.

(56) References Cited

U.S. PATENT DOCUMENTS

| | | | | |
|---|---|---|---|---|
| 5,815,134 A | * | 9/1998 | Nishi | .................. G09G 3/3688 345/87 |
| 2019/0033670 A1 | * | 1/2019 | Mizusako | ......... G02F 1/134363 |
| 2019/0383863 A1 | * | 12/2019 | Mizusaki | ................ H01Q 3/44 |

FOREIGN PATENT DOCUMENTS

| | | | | |
|---|---|---|---|---|
| JP | 2016-143037 A | | 8/2016 | |
| JP | 2016143037 | * | 8/2016 | .............. G02F 1/13 |

* cited by examiner

*Primary Examiner* — Sang V Nguyen
(74) *Attorney, Agent, or Firm* — Nath, Goldberg & Meyer; Jerald L. Meyer (57) ABSTRACT

The phase modulation device includes an image data generator, a gradation data generator, and a reflective liquid crystal element including a pixel region. The pixel region includes a plurality of pixel blocks and a blank area. The image data generator generates image data corresponding to a distribution of phase change amount or a distribution of phase velocity based on information data. The gradation data generator generates gradation data corresponding to each pixel based on the image data. The pixel block changes a wavefront of a signal light based on a driving voltage of the voltage pattern corresponding to the gradation data. In the blank area, a same driving voltage is applied to a pixel electrode of the pixel block and the adjacent pixel electrode.

5 Claims, 6 Drawing Sheets

PHASE MODULATION DEVICE

CROSS REFERENCE TO RELATED APPLICATION

This application is a Continuation of PCT Application No. PCT/JP2018/037206, filed on Oct. 4, 2018, and claims the priority of Japanese Patent Application No. 2017-197402, filed on Oct. 11, 2017, the entire contents of both of which are incorporated herein by reference.

BACKGROUND

The present disclosure relates to a phase modulation device using a liquid crystal element.

In recent years, in an optical communication field, an optical network system formed in an annular shape and an optical wavelength division multiplexing communication system have been proposed in order to cope with a rapidly increasing amount of information. A reconfigurable optical add/drop multiplexer (ROADM) device is used that can perform branching or insertion of an optical signal in these optical communication systems without relaying conversion to an electrical signal. In the ROADM device, as an optical switching device, a wavelength selective switch (WSS) device is used. As an optical switching element in the WSS device, a micro electro mechanical systems (MEMS) mirror, and a reflective liquid crystal element, for example, a liquid crystal on silicon (LCOS) element or the like are used.

The LCOS element is a reflective liquid crystal element having a pixel region in which a plurality of reflective pixel electrodes are arranged in a horizontal direction and a vertical direction. A refractive index of a liquid crystal on each pixel electrode changes by controlling a voltage applied to the liquid crystal for each pixel electrode. The phase velocity of the signal light is controlled for each pixel by changing the refractive index of the liquid crystal on each pixel.

The LCOS element can incline a wavefront of the signal light by changing the phase velocity stepwise for each pixel. The LCOS element can control an inclination angle of the wavefront of the signal light according to a rate of change of the phase velocity. That is, the LCOS element functions as a phase modulation element that reflects the signal light in a predetermined direction by changing the phase velocity for each pixel.

The MEMS mirrors are required corresponding to the number of wavelength bands of the signal light. For that reason, when the wavelength band of signal light or the number thereof is changed, the MEMS mirror has to be newly manufactured in accordance with the changed contents.

In contrast, the LCOS element can arbitrarily divide the pixel region into a plurality of pixel blocks and can control each pixel block. Therefore, when the wavelength band of signal light or the number thereof is changed, the pixel block can be reconfigured in accordance with the changed content, and thus it is not necessary to newly manufacture a liquid crystal element. That is, the LCOS element is superior in variable grid property than the MEMS mirror. In Japanese Unexamined Patent Application Publication No. 2016-143037, an example of the phase modulation device using the LCOS element is described.

SUMMARY

The LCOS element is irradiated with signal light for each pixel block. Usually, a blank area that does not contribute to phase modulation is formed between pixel blocks. Disclination may occur due to a potential difference between pixels in a pixel block and a blank area. Disclination means that liquid crystal molecules tilt in a direction different from the intended direction due to a potential difference between adjacent pixels. If the potential difference between the pixels is large, the lateral electric field becomes large, so that disclination is likely to occur or the occurrence area is widened.

Since the signal light is reflected at an inclination angle different from the target inclination angle due to the influence of disclination, the crosstalk incident on an output port different from the target output port occurs.

An aspect of one or more embodiments provides a phase modulation device including: an image data generator configured to generate image data corresponding to a distribution of phase change amount or a distribution of phase velocity based on information data; a gradation data generator configured to generate gradation data corresponding to each pixel based on the image data; and a reflective liquid crystal element having a pixel region in which a plurality of pixel electrodes are arranged and a driving voltage of a sawtooth waveform voltage pattern corresponding to the gradation data is applied; wherein the pixel region includes: a plurality of pixel blocks configured to modulate a phase of incident signal light based on the voltage pattern to change the wavefront of the signal light, and a first blank area formed between pixel blocks in a first direction in which the voltage pattern is repeated, and wherein, in the first blank area, two or more pixel electrodes are arranged in the first direction, and a same driving voltage as the driving voltage applied to a pixel electrode of the pixel block is applied to a pixel electrode adjacent to the pixel electrode of the pixel block.

DETAILED DESCRIPTION

A phase modulation device according to one or more embodiments will be described with reference to FIG. 1. A phase modulation device 1 includes an image data generator 2, a gradation data generator 3, and a reflective liquid crystal element 10. The reflective liquid crystal element 10 is an LCOS element, for example. Hereinafter, the reflective liquid crystal element 10 is referred to as an LCOS element 10.

Information data JD is input to the image data generator 2. The information data JD includes a parameter indicating a relationship between positions of an input port and an output port of signal light and an angle of reflected light with respect to incident light in the signal light, and a wavelength related to a wavelength band of the signal light, that is, a distribution of phase change amount that realizes a desired reflected light angle. The phase change amount is the lead or lag of the phase of the reflected light with respect to the phase of the incident light, and corresponds to the distribution of phase velocity. The signal light emitted from a predetermined input port is phase-modulated by the phase modulation device 1 and enters a target output port.

The image data generator 2 sets the distribution of phase change amount based on the information data JD. The image data generator 2 generates image data DD based on the distribution of phase change amount or the distribution of phase velocity, and outputs the generated image data DD to the gradation data generator 3. The gradation data generator 3 generates gradation data DS corresponding to each pixel in the LCOS element 10 of the image data DD, and outputs the gradation data DS to the LCOS element 10 in accordance with the timing of writing to each pixel. A driving voltage corresponding to this gradation is generated in the LCOS element 10 and applied to the liquid crystal.

Figure 2:
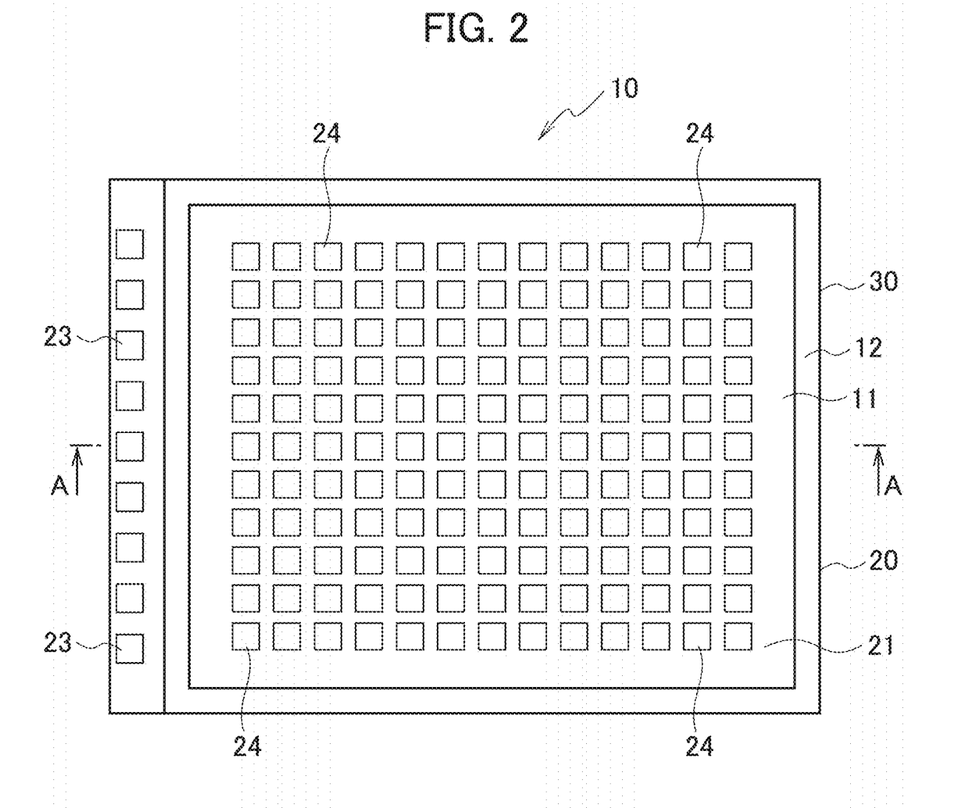
FIG. 2 is a top view illustrating an example of a reflective liquid crystal element.
Figure 3:
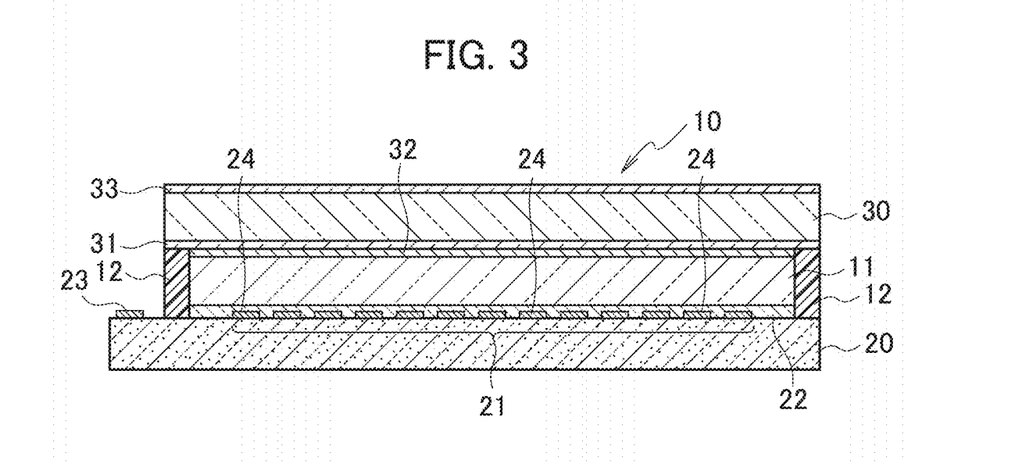
FIG. 3 is a cross-sectional view of the reflective liquid crystal element taken along line A-A in FIG. 2.

A configuration example of the LCOS element 10 will be described with reference to FIG. 2 or 3. The LCOS element 10 includes a driving substrate 20, a transparent substrate 30, liquid crystals 11, and a sealing material 12. The driving substrate 20 includes a pixel region 21, an alignment film 22, and a connection terminal 23.

In the pixel region 21, a plurality of reflective pixel electrodes 24 are arranged in the horizontal and vertical directions. One pixel electrode 24 constitutes one pixel. The alignment film 22 is formed at least on the pixel region 21. The connection terminal 23 is formed on the outer peripheral portion of the driving substrate 20, receives the gradation data DS from the gradation data generator 3, and receives a timing control signal from the outside. The connection terminal 23 is also connected to a power supply and the like from the outside.

The transparent substrate 30 includes a transparent electrode 31 and an alignment film 32. The alignment film 32 is formed on the transparent electrode 31. The driving substrate 20 and the transparent substrate 30 are bonded to each other with a gap by the sealing material 12 so that the pixel electrode 24 and the transparent electrode 31 face each other.

The sealing material 12 is formed in an annular shape along the outer peripheral portion of the pixel region 21. The liquid crystals 11 are filled in a gap between the driving substrate 20 and the transparent substrate 30, and are sealed by the sealing material 12. An anti-reflection film 33 may be formed on the surface opposite to the surface on which the transparent electrode 31 of the transparent substrate 30 is formed.

A semiconductor substrate (a silicon substrate, for example) can be used as the driving substrate 20. A drive circuit for driving each pixel is formed on the driving substrate 20. As a material of the pixel electrode 24 and the connection terminal 23, a metal material containing aluminum as a main component can be used.

As the transparent substrate 30, a non-alkali glass substrate or a quartz glass substrate can be used. As a material of the transparent electrode 31, Indium Tin Oxide (ITO) can be used. A dielectric film may be formed above and below the ITO film. As the sealing material 12, an ultraviolet curable resin, a thermosetting resin, or a resin that is cured by using both ultraviolet light and heat can be used. As the anti-reflection film 33, a dielectric multilayer film can be used.

The phase modulation of the signal light by the LCOS element 10 will be described with reference to FIGS. 4, 5A, and 5B. In order to make the description easy to understand, a case where a pixel block 25 is configured by three pixel electrodes 24 will be described. Usually, the pixel block 25 has a configuration in which three or more pixel electrodes 24 are arranged in the horizontal direction and the vertical direction, respectively. In order to distinguish each pixel electrode 24, it is assumed to be pixel electrodes 24a, 24b, and 24c from the left.

Figure 1:
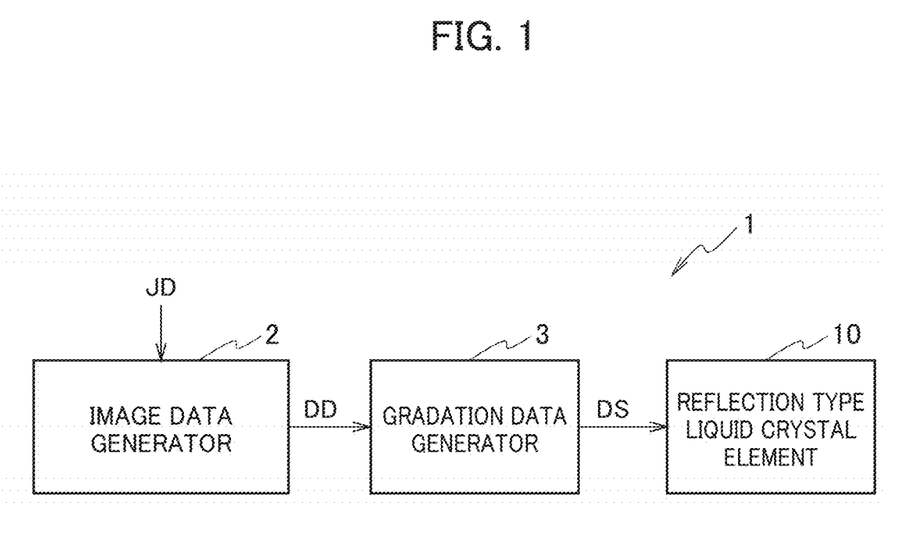
FIG. 1 is a block diagram illustrating a phase modulation device according to one or more embodiments.
Figure 5A:
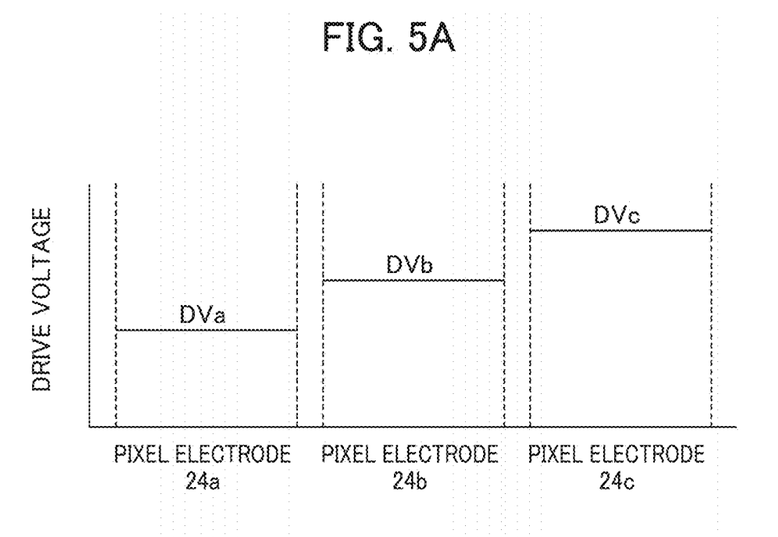
FIG. 5A is a diagram illustrating a driving voltage applied to a pixel electrode.

Based on the image data DD corresponding to the distribution of phase change amount (distribution of phase velocity) generated by the image data generator 2 illustrated in FIG. 1, different driving voltages DVa, DVb, and DVc are applied to the pixel electrodes 24a, 24b, and 24c, respectively, as illustrated in FIG. 5A. Actually, the driving voltages DVa, DVb, and DVc applied to the liquid crystals 11 are voltages applied between the pixel electrodes 24a, 24b, and 24c and the transparent electrode 31. Since the liquid crystals 11 have anisotropy in the refractive index and the dielectric constant of the constituent molecules, the refractive index changes by changing the tilt of the molecules according to the applied voltage.

Figure 5B:
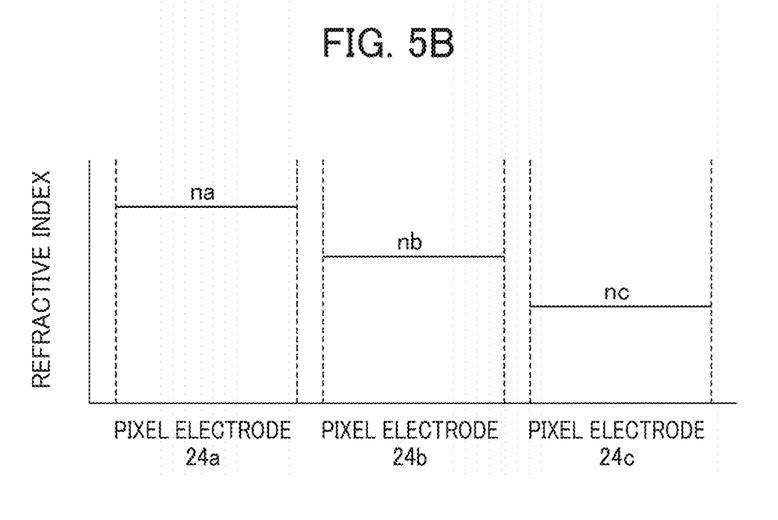
FIG. 5B is a diagram illustrating a refractive index of a liquid crystal on the pixel electrode.

Therefore, as illustrated in FIG. 5B, the liquid crystals 11 on the pixel electrode 24a have a first refractive index na, the liquid crystals 11 on the pixel electrode 24b have a second refractive index nb, and the liquid crystals 11 on the pixel electrode 24c have a third refractive index nc (na>nb>nc). The refractive indexes na to nc are average refractive indexes of the liquid crystals 11 on the pixel electrodes 24a to 24c.

Signal light SL output from the input port is incident on the pixel block 25 in a state of linearly polarized light of p-polarized light or s-polarized light. The alignment films 22 and 32 illustrated in FIG. 3 are formed so that the deflection direction of the signal light SL and the alignment direction of the liquid crystals 11 are the same. The alignment direction is a direction in which the liquid crystals 11 in the vicinity of the alignment film 22 are inclined, for example. The direction in which the liquid crystals 11 in the vicinity of the alignment film 32 are inclined may be the alignment direction.

By making the deflection direction of the signal light SL and the alignment direction of the liquid crystal 11 the same, it is possible to suppress attenuation of the signal light SL caused by the modulation of linearly polarized light into elliptically polarized light and the p-polarized light having an s-polarized light component or the s-polarized light having a p-polarized light component, and the signal light SL can be efficiently reflected.

Figure 4:
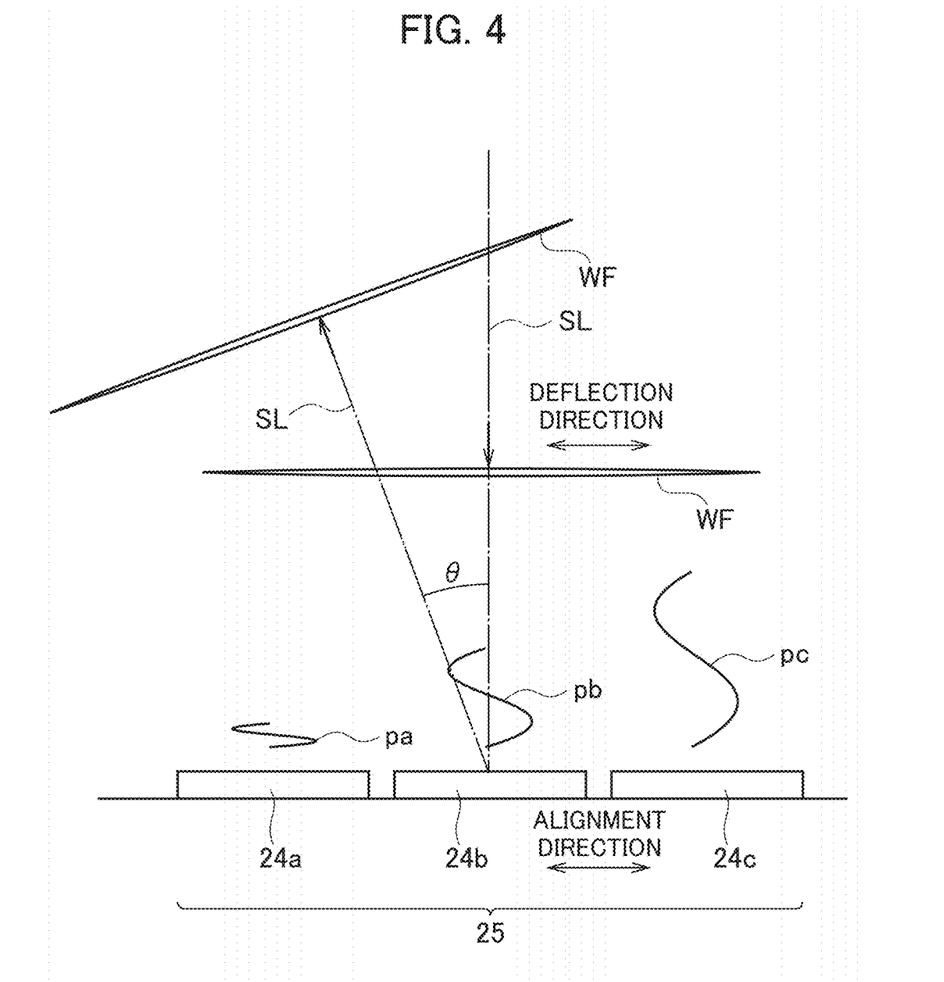
FIG. 4 is a diagram illustrating phase modulation of the signal light by a reflective liquid crystal element.

Pa, pb, and pc illustrated in FIG. 4 schematically show a difference in the phase velocity caused by a difference in the refractive index of the liquid crystals 11 on the pixel electrodes 24a, 24b, and 24c. A WF illustrated in FIG. 4 schematically illustrates a wavefront of the signal light SL. The wavefront WF is a surface in which the phases of the signal light SL are aligned. The phase change amount or phase velocity of the signal light SL increases stepwise from the pixel electrode 24a toward the pixel electrode 24c. As a result, the wavefront WF of the signal light SL can be changed (inclined).

By the driving voltages DVa, DVb, and DVc, an inclination angle θ of the wavefront WF can be increased by increasing the difference in the refractive index of the liquid crystal 11 on the pixel electrodes 24a, 24b, and 24c and increasing the difference in phase change. The inclination angle θ of the wavefront WF can be reduced by reducing the difference in the refractive index of the liquid crystals 11 on the pixel electrodes 24a, 24b, and 24c, and reducing the difference in the phase change. The inclination angle θ corresponds to an angle formed by the wavefront WF of the signal light SL and the perpendicular lines of the pixel electrodes 24a, 24b, and 24c. The inclination angle θ of the wavefront WF can be changed by changing the number of pixel electrodes 24.

The signal light SL is reflected by the pixel electrodes 24a, 24b, and 24c with the wavefront WF having a predetermined inclination angle θ based on the image data DD generated by the image data generator 2. Therefore, the LCOS element 10 can reflect the signal light SL in a predetermined direction by changing the phase velocity of the signal light SL stepwise for each pixel based on the image data DD.

The LCOS element 10 can control the inclination angle θ of the wavefront WF of the signal light SL according to the rate of change of the phase velocity. That is, the LCOS element 10 functions as a phase modulation element that changes the phase velocity for each pixel and reflects the signal light SL in a predetermined direction. When the LCOS element 10 controls the inclination angle θ of the wavefront WF of the signal light SL, the signal light SL is incident on a target output port.

Figure 6:
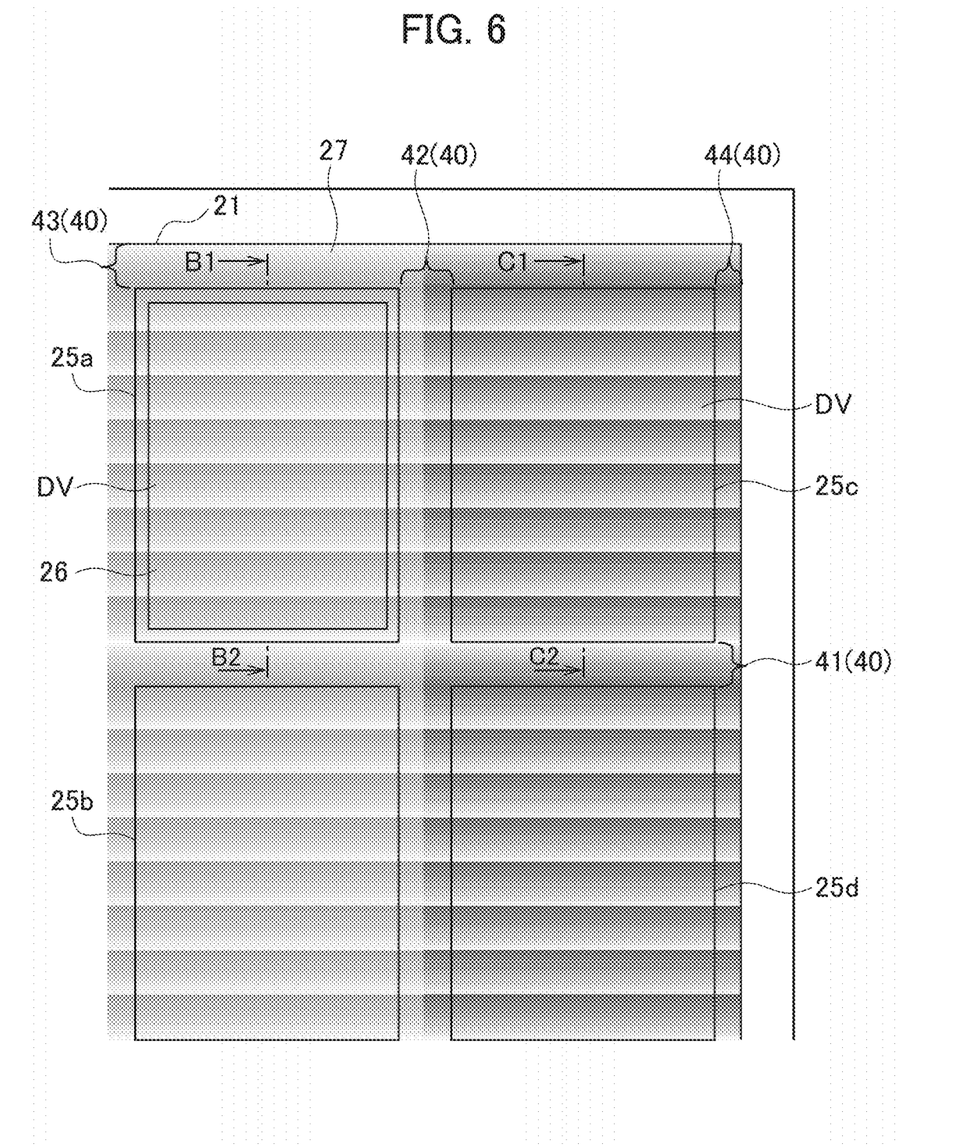
FIG. 6 is a diagram for explaining a relationship between a pixel block and a blank area.

The relationship between the pixel block and the blank area in the pixel region 21 will be described with reference to FIGS. 6, 7A, and 7B. FIG. 6 illustrates an enlarged right upper portion of the pixel region 21 illustrated in FIG. 2. The pixel region 21 is configured by a plurality of pixel blocks 25. The signal light SL enters each pixel block 25.

The range and position of the pixel block 25 are determined based on the information data JD. The pixel block 25 is configured to include an incident area 26 on which the signal light SL is incident. The incident area 26 is determined based on the spot diameter, spot shape, incident position accuracy, and the like of the signal light SL. The LCOS element 10 can reconfigure the pixel block 25 in accordance with the changed contents of the information data JD.

The LCOS element 10 can control the inclination angle θ of the wavefront WF of the signal light SL for each pixel block 25 based on the image data DD generated by the image data generator 2. In order to distinguish each pixel block 25, the upper left pixel block 25 in FIG. 6 is referred to as a pixel block 25a, the lower left pixel block 25 is referred to as a pixel block 25b, the upper right pixel block 25 is referred to as a pixel block 25c, and the lower right pixel block 25 is referred to as a pixel block 25d.

The signal light SL of different wavelength bands can be made incident on the pixel blocks 25a to 25d. The LCOS element 10 can apply driving voltages DV having different voltage patterns to the pixel blocks 25a to 25d based on the image data DD.

A case where a driving voltage DV is controlled by the amplitude of the voltage value will be described with reference to FIGS. 7A and 7B. FIG. 7A illustrates a voltage pattern of the driving voltage DV of the continuous pixels along B1-B2 of the pixel block 25a illustrated in FIG. 6. Although the same voltage pattern as that of the pixel block 25a is illustrated in the pixel block 25c in FIG. 6, a driving voltage DV having a different voltage pattern can be applied.

Figure 7A:
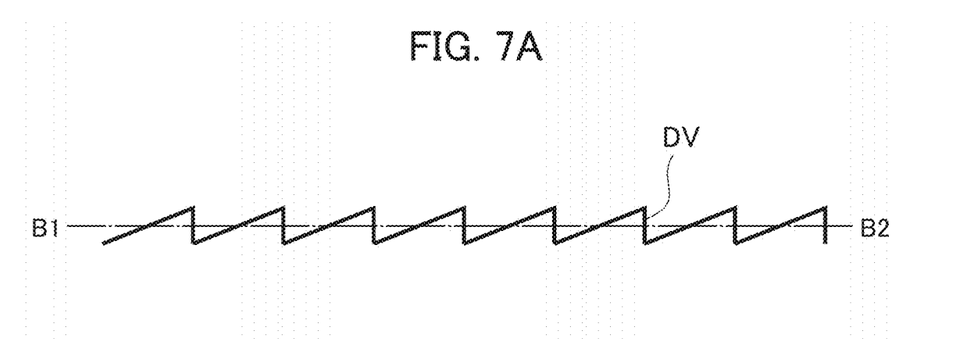
FIG. 7A is a diagram illustrating an example of a voltage pattern of a driving voltage along B1-B2 in FIG. 6.
Figure 7B:
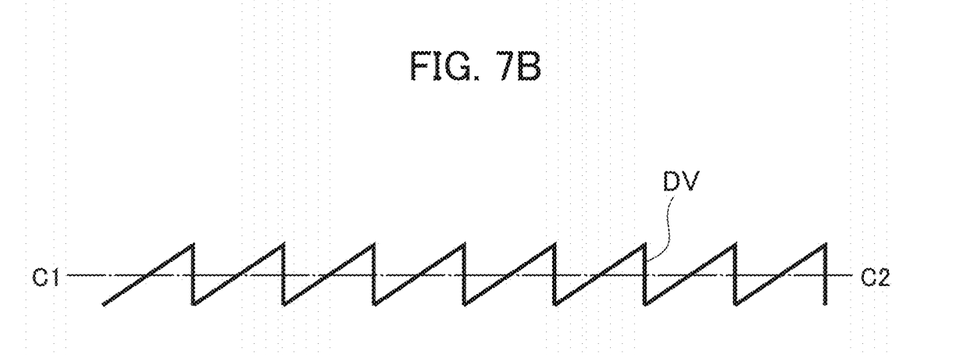
FIG. 7B is a diagram illustrating an example of a voltage pattern of a driving voltage along C1-C2 in FIG. 6.

FIG. 7B illustrates a voltage pattern of the driving voltage DV of the continuous pixels along C1-C2 of the pixel block 25c illustrated in FIG. 6. Although the same voltage pattern as that of the pixel block 25c is illustrated in the pixel block 25d in FIG. 6, a driving voltage DV having a different voltage pattern can be applied.

As illustrated in FIGS. 7A and 7B, the driving voltage DV has a sawtooth waveform voltage pattern. Since the voltage is actually a voltage for each continuous pixel, the voltage has a stepped shape, but here, the voltage is illustrated in a sawtooth shape. In the pixel blocks 25a to 25d illustrated in FIG. 6, dark portions correspond to low voltage portions of the voltage pattern of the driving voltage DV illustrated in FIG. 7A or 7B, and bright portions correspond to high voltage portions. Since the voltage pattern illustrated in FIG. 7B has a larger amplitude of the voltage value than the voltage pattern illustrated in FIG. 7A, the inclination angle θ of the wavefront WF of the signal light SL increases.

Here, it is assumed that the liquid crystals 11 are a horizontally aligned liquid crystal material, that is, a liquid crystal material having a positive dielectric anisotropy. In a horizontally aligned liquid crystal, the refractive index increases as the voltage amplitude is increased. In the case of a vertically aligned liquid crystal material, that is, a liquid crystal material having a negative dielectric anisotropy, the refractive index is lowered by increasing the voltage amplitude. Moreover, the refractive index and the anisotropy of the refractive index differ depending on the liquid crystal material. In addition, the resulting phase change amount differs depending on the thickness of the liquid crystal layer.

The voltage pattern of the driving voltage DV is set based on the image data DD generated by the image data generator 2. Therefore, the ranges and positions of the pixel blocks 25a to 25d are determined based on the information data JD, the incident signal light SL is phase-modulated based on the voltage pattern of the driving voltage DV, thereby changing (inclining) the wavefront WF of the signal light SL. The control by a PWM method in which the driving voltage DV is controlled by a pulse width or the number of pulses is also effective. In this case, the vertical axis in FIGS. 7A and 7B corresponds to the integration time of the applied pulse of the driving voltage DV in one frame.

As illustrated in FIG. 6, a blank area 40 that does not contribute to phase modulation is usually formed between the pixel blocks 25 and in an outer peripheral area 27 of the pixel region 21. The blank area 40 formed between the pixel blocks 25 in a first direction (vertical direction in FIG. 6) in which the sawtooth waveform voltage pattern is repeated is referred to as a blank area 41 (first blank area), and the blank area 40 formed between the pixel blocks 25 in a second direction (the left-right direction in FIG. 6) orthogonal to the first direction is referred to as a blank area 42 (second blank area).

The blank area 40 formed adjacent to the pixel block 25 in the outer peripheral area 27 of the pixel region 21 in the first direction is referred to as a blank area 43 (third blank area), and the blank area 40 formed adjacent to the pixel block 25 in the outer peripheral area 27 of the pixel region 21 in the second direction is referred to as a blank area 44 (fourth blank area).

The blank area 41 is adjacent to the pixel blocks 25a and 25b, and is adjacent to the pixel blocks 25c and 25d. In the blank area 41, two or more pixel electrodes 24 are arranged in the first direction. A driving voltage DV having the same voltage value or pulse width as the driving voltage DV applied to the pixel electrode 24 of the pixel block 25a is applied to the pixel electrode 24 of the blank area 41 adjacent to the pixel electrode 24 of the pixel block 25a.

A driving voltage DV having the same voltage value or pulse width as the driving voltage DV applied to the pixel electrode 24 of the pixel block 25b is applied to the pixel electrode 24 of the blank area 41 adjacent to the pixel electrode 24 of the pixel block 25b.

For example, the voltage value of the driving voltage DV applied to the pixel electrode 24 of the pixel block 25a is assumed to be va, and the voltage value of the driving voltage DV applied to the pixel electrode 24 of the pixel block 25b is assumed to be vb (va>vb). A driving voltage DV having the voltage value va is applied to the pixel electrode 24 of the blank area 41 adjacent to the pixel electrode 24 of the pixel block 25a, and a driving voltage DV having the voltage value vb is applied to the pixel electrode 24 of the blank area 41 adjacent to the pixel electrode 24 of the pixel block 25b.

Therefore, the potential difference between the pixel blocks 25a and 25b and the blank area 41 can be reduced, so that the occurrence of disclination can be suppressed. The relationship of the driving voltages DV between the pixel blocks 25c and 25d and the blank area 41 is the same as the relationship of the driving voltages DV between the pixel blocks 25a and 25b and the blank area 41.

The blank area 42 is adjacent to the pixel blocks 25a and 25c, and is adjacent to the pixel blocks 25b and 25d. In the blank area 42, two or more, preferably four or more pixel electrodes 24 are arranged in the second direction. A driving voltage DV having the same voltage pattern as that of the adjacent pixel block 25 is applied to the blank area 42.

Specifically, a driving voltage DV having the same voltage value or pulse width as the driving voltage DV applied to the pixel electrode 24 of the pixel block 25a is applied to the pixel electrode 24 of the blank area 42 adjacent to the pixel electrode 24 of the pixel block 25a. Moreover, a driving voltage DV having the same voltage value or pulse width as the driving voltage DV applied to the pixel electrode 24 of the pixel block 25c is applied to the pixel electrode 24 of the blank area 42 adjacent to the pixel electrode 24 of the pixel block 25c.

Accordingly, the potential difference between the pixel blocks 25a and 25c and the blank area 42 can be reduced, so that occurrence of disclination can be suppressed. The relationship of the driving voltages DV between the pixel blocks 25b and 25d and the blank area 42 is the same as the relationship of the driving voltages DV between the pixel blocks 25a and 25c and the blank area 42.

The blank area 43 is adjacent to the pixel blocks 25a and 25c. In the blank area 43, one or more, preferably two or more pixel electrodes 24 are arranged in the first direction. A driving voltage DV having the same voltage value or pulse width as the driving voltage DV applied to the pixel electrode 24 of the pixel block 25a is applied to the pixel electrode 24 of the blank area 43 adjacent to the pixel electrode 24 of the pixel block 25a.

For example, if the voltage value of the driving voltage DV applied to the pixel electrode 24 of the pixel block 25a adjacent to the blank area 43 is vc, a driving voltage DV having the voltage value vc is applied to the pixel electrode 24 of the blank area 43 adjacent to the pixel electrode 24 of the pixel block 25a.

Therefore, the potential difference between the pixel block 25a and the blank area 43 can be reduced, so that the occurrence of disclination can be suppressed. The relationship of the driving voltages DV between the pixel block 25c and the blank area 43 is the same as the relationship of the driving voltages DV between the pixel block 25a and the blank area 43.

The blank area 44 is adjacent to the pixel blocks 25c and 25d. In the blank area 44, one or more, preferably two or more pixel electrodes 24 are arranged in the second direction. A driving voltage DV having the same voltage pattern as that of the adjacent pixel block 25 is applied to the blank area 44. Specifically, a driving voltage DV having the same voltage value or pulse width as the driving voltage DV applied to the pixel electrode 24 of the pixel block 25c is applied to the pixel electrode 24 of the blank area 44 adjacent to the pixel electrode 24 of the pixel block 25c.

Accordingly, the potential difference between the pixel block 25c and the blank area 44 can be reduced, so that occurrence of disclination can be suppressed. The relationship of the driving voltages DV between the pixel block 25d and the blank area 44 is the same as the relationship of the driving voltages DV between the pixel block 25c and the blank area 44.

In accordance with the phase modulation device 1 according to one or more embodiments, a driving voltage DV having the same voltage value or pulse width as the driving voltage DV applied to the pixel electrode 24 of the pixel block 25 is applied to the pixel electrode 24 of the blank area 40 adjacent to the pixel electrode 24 of the pixel block 25. Thus, it is possible to suppress the occurrence of disclination due to the potential difference between the pixels in the pixel block 25 and the blank area 40.

The present invention is not limited to one or more embodiments described above, and various modifications may be made thereto without departing from the scope of the present invention.

The phase modulation device 1 according to one or more embodiments has a configuration in which the blank area 41 has two or more pixel electrodes 24 arranged in the first direction, and the blank area 42 has two or more pixel electrodes 24 arranged in the second direction. In addition, the phase modulation device 1 has a configuration in which the blank area 43 has one or more pixel electrodes 24 arranged in the first direction, and the blank area 44 has one or more pixel electrodes 24 arranged in the second direction. The number of pixel electrodes 24 arranged in each of the blank areas 40 is appropriately set based on the information data JD so as to suppress the occurrence of disclination.

What is claimed is:

1. A phase modulation device comprising:
    an image data generator configured to generate image data corresponding to a distribution of phase change amount or a distribution of phase velocity based on information data;
    a gradation data generator configured to generate gradation data corresponding to each pixel based on the image data; and
    a reflective liquid crystal element having a pixel region in which a plurality of pixel electrodes are arranged and a driving voltage of a sawtooth waveform voltage pattern corresponding to the gradation data is applied; wherein
    the pixel region comprises:
        a plurality of pixel blocks configured to modulate a phase of incident signal light based on the voltage pattern to change a wavefront of the signal light, and
        a first blank area formed between pixel blocks in a first direction in which the voltage pattern is repeated, and
    in the first blank area, two or more pixel electrodes are arranged in the first direction, and a same driving voltage as the driving voltage applied to a pixel electrode of the pixel block is applied to a pixel electrode adjacent to the pixel electrode of the pixel block.

2. The phase modulation device according to claim 1, wherein
the pixel region further comprises a second blank area formed between pixel blocks in a second direction orthogonal to the first direction, and
in the second blank area, two or more pixel electrodes are arranged in the second direction, and a same driving voltage as the driving voltage applied to a pixel electrode of the pixel block is applied to a pixel electrode adjacent to the pixel electrode of the pixel block.

3. The phase modulation device according to claim 1, wherein
the pixel region further comprises a third blank area formed adjacent to the pixel block in an outer peripheral area of the pixel region in the first direction, and
in the third blank area, a same driving voltage as the driving voltage applied to a pixel electrode of the pixel block is applied to a pixel electrode adjacent to the pixel electrode of the pixel block.

4. The phase modulation device according to claim 2, wherein
the pixel region further comprises a fourth blank area formed adjacent to the pixel block in an outer peripheral area of the pixel region in the second direction, and
in the fourth blank area, a same driving voltage as the driving voltage applied to a pixel electrode of the pixel block is applied to a pixel electrode adjacent to the pixel electrode of the pixel block.

5. The phase modulation device according to claim 1, wherein
the information data comprises a parameter indicating a relationship between positions of an input port and an output port of the signal light and an angle of reflected light with respect to incident light in the signal light, and a parameter of a wavelength band of the signal light.

* * * * *